United States Patent
Jones et al.

(10) Patent No.: US 10,546,258 B2
(45) Date of Patent: Jan. 28, 2020

(54) APPARATUS AND METHOD OF IDENTIFYING AN OVERSTATED PERPETUAL INVENTORY IN A RETAIL SPACE

(71) Applicant: Walmart Apollo, LLC, Bentonville, AR (US)

(72) Inventors: Matthew A. Jones, Bentonville, AR (US); Robert J. Taylor, Rogers, AR (US); Roger Snelgrove, Fayetteville, AR (US); Rahul Tripathi, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 556 days.

(21) Appl. No.: 15/313,870

(22) PCT Filed: May 29, 2015

(86) PCT No.: PCT/US2015/033224
§ 371 (c)(1),
(2) Date: Nov. 23, 2016

(87) PCT Pub. No.: WO2015/184286
PCT Pub. Date: Dec. 3, 2015

(65) Prior Publication Data
US 2017/0200106 A1 Jul. 13, 2017

Related U.S. Application Data
(60) Provisional application No. 62/005,827, filed on May 30, 2014.

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC . G06Q 10/06315; G06Q 10/08; G06Q 10/087
USPC ........................................................ 705/7.25
See application file for complete search history.

(56) References Cited

U.S. PATENT DOCUMENTS 5,963,919 A * 10/1999 Brinkley .............. G06Q 10/087
705/22
7,092,929 B1 8/2006 Dvorak
(Continued)

FOREIGN PATENT DOCUMENTS

EP 1901215 3/2008

OTHER PUBLICATIONS

Anonymous; "Approaching Inventory Management: A New Angle"; Chain Store Age Executive with Shopping Center Age, Suppl, Inventory Management; Lebhar-Friedman, Inc.; Dec. 1994; pp. 1-9.
(Continued)

*Primary Examiner* — Dylan C White
(74) *Attorney, Agent, or Firm* — Fitch, Even, Tabin & Flannery LLP

(57) ABSTRACT

Methods and apparatuses are provided to automatically identify overstated perpetual inventory (PI) conditions regarding an inventory level of an item in a retail space. For example, in some embodiments, a method performed by a control circuit comprises determining (504) that, a plurality of times, an item for sale at a retail store sells within a defined tolerance of a non-zero inventory quantity value and then stops selling for a period of time; and making (506) a determination that an overstated PI condition exists with respect to an inventory level of the item at the retail store. In some embodiments, the overstated PI condition is automatically quantified and may be automatically corrected.

27 Claims, 5 Drawing Sheets

(56) References Cited

U.S. PATENT DOCUMENTS

| | | | | |
|---|---|---|---|---|
| 8,321,303 | B1* | 11/2012 | Krishnamurthy | 705/28 |
| 9,916,560 | B2* | 3/2018 | Vasantham | G06Q 10/087 |
| 2010/0138280 | A1* | 6/2010 | Fowler | G06Q 10/087 |
| | | | | 705/28 |
| 2013/0144757 | A1* | 6/2013 | Bauer | G06K 7/0008 |
| | | | | 705/26.61 |
| 2018/0189760 | A1* | 7/2018 | Brooks | G06N 20/00 |

OTHER PUBLICATIONS

Greene, C.; "When Employees Count Too Much"; http://www.mcgoverngreene.com/archives/archive_articles/Craig_Greene_Archives/inventory_accounting.html; Apr. 15, 2014, pp. 1-5.

Hardcourt, Inc.; "Inventories and Costs of Goods Sold"; Chapter 6; http://www.swlearning.com/accounting/porteralt3e/instructor/im/pn_chap06.pdf.; 2006, pp. 1-19.

Hardgrave, et al.; "Does RFID Technology-Enabled Visibility Improve Inventory Accuracy"; waltoncollege.uark.edu/.../PI%20paper%2026%20Oct%202008.docx; Oct. 28, 2008, pp. 1-16.

Hirschfeld, L.; "An Overview of Inventory Examination Procedures"; The Secured Lender, vol. 52, No. 3, May-Jun. 1996, pp. 1-8.

Mathaba, et al.; "Interfacing Internet of Things Technologies of RFID, XMPP and Twitter to Reduce Inaccuracies in Inventory Management"; http://researchspace.csir.co.za/dspace/bitstream/10204/5891/1/Mathaba_2012.pdf, 2012, pp. 1-12.

PCT; App. No. PCT/US2015/033224; International Search Report and Written Opinion dated Aug. 25, 2015.

* cited by examiner

```
For each tuple <s, i, oh, ts>:
    if (item i has selling value > p):
        if (oh not-equals lastOnHand[s,i]):
            lastOnHand[s,i] = oh;
            periodActive[s,i] = 1;
        else if (not marked[s,i]):
            ++periodActive[s,i];
            if (periodActive[s,i] > t):
                marked[s,i] = true;
                if (store-item <s,i> in potentialOverstatedItems):
                    if (oh equals overstatedOnHand[s,i]):
                        ++frequencyOverstated[s,i];
                        timePeriods[s,i] = timePeriods[s,i] union {ts}
                        if (frequencyOverstated[s,i] > c):
                            output "<s, i, timePeriods[s,i]>";
                            remove <s,i> from potentialOverstatedItems
                    else:
                        .........
```

FIG. 6

```
For each tuple <s, i, oh, ts>:
    if item i has selling value > p:
        create a new record newRecord[s, i] with the following information
            - item = i; timestamp = ts; duration = 1; onhand = oh; plus some other information,
              initialized to default values, for book-keeping (e.g., computing expected sales)

if recordStack[s, i] is currently empty:
            insert newRecord[s, i] in recordStack[s, i]

else: // if recordStack[s, i] is nonempty
            let lastRecord[s, i] be the top most record in recordStack[s, i];
            let lastTimestamp = lastRecord[s, i].timestamp;
            let lastOnhand = lastRecord[s, i].onhand;
            let lastDuration = lastRecord[s, i].duration;

if current timestamp ts equals lastTimestamp + 1:
                if current onhand oh < lastOnhand:
                    empty recordStack[s, i]; insert newRecord[s, i] in recordStack[s, i];
                else if current onhand oh equals lastOnhand:
                    update lastRecord[s,i] with ++lastRecord[s,i].duration
                else if current onhand oh > lastOnhand:
                    if (lastDuration < t):
                        ...
                    else if (lastDuration ≥ t):
                        ...
            else if current timestamp ts > lastTimeStamp:
                [ ...

if the number of records in recordStack[s, i] > c:
    let timePeriods[s, i] = list of timestamps and durations of records in recordStack[s, i];
    output "<s, i, timePeriods[s, i]>"
```

APPARATUS AND METHOD OF IDENTIFYING AN OVERSTATED PERPETUAL INVENTORY IN A RETAIL SPACE

RELATED APPLICATIONS(S)

This application is filed in accordance with 35 U.S.C. 371 claiming priority to International Application No. PCT/US2015/033224, with international filing date of May 29, 2015, which claims the benefit of U.S. Provisional Application No. 62/005,827, filed May 30, 2014, all of which are incorporated by reference in their entirety herein.

TECHNICAL FIELD

This invention relates generally to accuracy of inventory in a retail environment.

BACKGROUND

In a retail environment, accuracy of inventory can be important to an effective and efficient supply chain. For example, inventory records are used in forecasting, ordering and replenishment of products. Traditionally, actual and accurate knowledge of a retailers' on hand inventory of products is difficult to obtain. Many factors can throw off the true on hand inventory, such as errors in products shipped/received, losses, data errors, improperly processed product returns, etc. Thus, retailers only have accurate information as to what inventory the system thinks is on hand, which is referred to as perpetual inventory (PI).

Overstated PI with respect to an inventory item is a condition where the perpetual inventory is a higher number than the actual number of units on hand for the item. In other words, the PI is overstated since there is less actual inventory than indicated by the system. Overstated PI may be referred to as phantom inventory and can have a negative effect on the retailer. One serious consequence of overstated PI is that items for sale may become out of stock without regular replenishment or may even not reach a replenishment point, resulting in missed product sales.

BRIEF DESCRIPTION OF THE DRAWINGS

Disclosed herein are embodiments of apparatuses and methods pertaining to determining whether an overstated perpetual inventory condition exists regarding an inventory level of an item for a retail setting. This description includes drawings, wherein:

FIG. 6 is an exemplary algorithm in accordance with some embodiments.

FIG. 7 is another exemplary algorithm in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to automatically determine whether an overstated perpetual inventory (PI) condition exists regarding an inventory level of an item in a retail establishment. In some embodiments, the overstated PI condition may be quantified and the PI of the system adjusted such that the PI more closely matches (or precisely matches) the actual on hand inventory. In some embodiments, a method performed by a control circuit comprises determining that, a plurality of times, an item for sale at a retail store sells within a defined tolerance of a non-zero inventory quantity value and then stops selling for a period of time; and to making a determination that an overstated perpetual inventory (PI) condition exists with respect to an inventory level of the item at the retail store.

Figure 1:
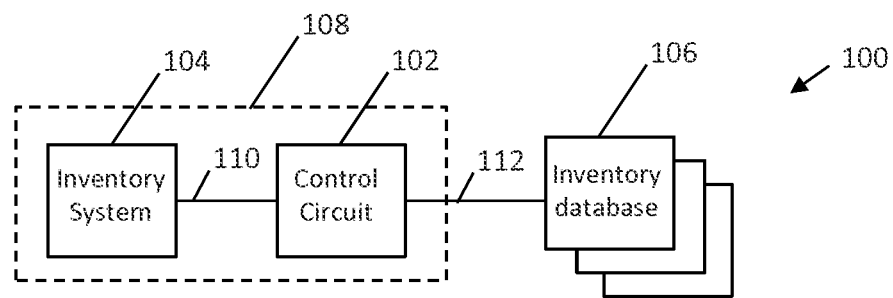
FIG. 1 is a block diagram in accordance with several embodiments.

Referring now to FIG. 1, a system 100 is shown including a control circuit 102 coupled to an inventory control system 104 (e.g., via link 110) and to one or more inventory databases 106 (e.g., via link 112). The databases 106 store cyclic sales data such as on hand inventory values for a plurality of items, such as items for sale in a retail store. For example, the databases 106 store, for each of a plurality of items, the number of units of the item sold in a given period of time (e.g., in a day) at a given store and/or the on hand value of the item (i.e., the total number of units of the item in a given store at a particular moment in time). In a typical retail setting, the databases 106 may store cyclic sales data for many items being sold. For example, the databases 106 may store sales data and/or inventory levels for least 100 different items for sale by the retail store; at least 1,000 different items for sale by the retail store; or at least 10,000 different items for sale by the retail store.

In accordance with some embodiments, the control circuit 102 receives cyclic sales data and/or inventory levels for one or more items being evaluated to determine if an overstated PI condition exists. Embodiments of this process are described further herein. The control circuit 102 may be located at a given retail store location and receive and process sales data for items sold at that location, i.e., the control circuit is a decentralized system for determining and quantifying overstated PI conditions. In other embodiments, the control circuit 102 may be located at a location remote from the retail store and/or from the one or more inventory databases 106. For example, the control circuit is coupled to the inventory databases 106 via the link 112, which is a wide area network or other wired and/or wireless network connection. In some embodiments, the control circuit 102 is at a separate location than the location of the inventory control system 104, i.e., the control circuit is a centralized system for determining and quantifying overstated PI conditions. For example, the control circuit 102 is coupled to the inventory control system 104 via the link 110 which is a wide area network or other wired and/or wireless network connection. In some embodiments, the control circuit is at the site or location of the inventory control or is part of the inventory control (such as shown by dashed box 108). The inventory control system 104 functions as the inventory management system for one or more retail stores, and may be responsible for at least forecasting, ordering and replenishing products. In some embodiments, the control circuit 102 (and/or one or both of the inventory control system 104 and the inventory database 108) may be implemented as multiple cooperating and/or redundant control circuits. In some embodiments, the control circuit 102 (and/or one or both of the inventory control system 104 and the inventory database 108) may be implemented in a distributed environment in which multiple networked control circuits (or portions thereof) at one or more locations each perform at least a portion of the tasks/computations and share and coordinate with each other to determine and quantify overstated PI conditions. It is understood that the control circuit may be configured to determine whether an overstated PI condition exists with respect to one or more items of inventory in one or more retail spaces.

Figure 2:
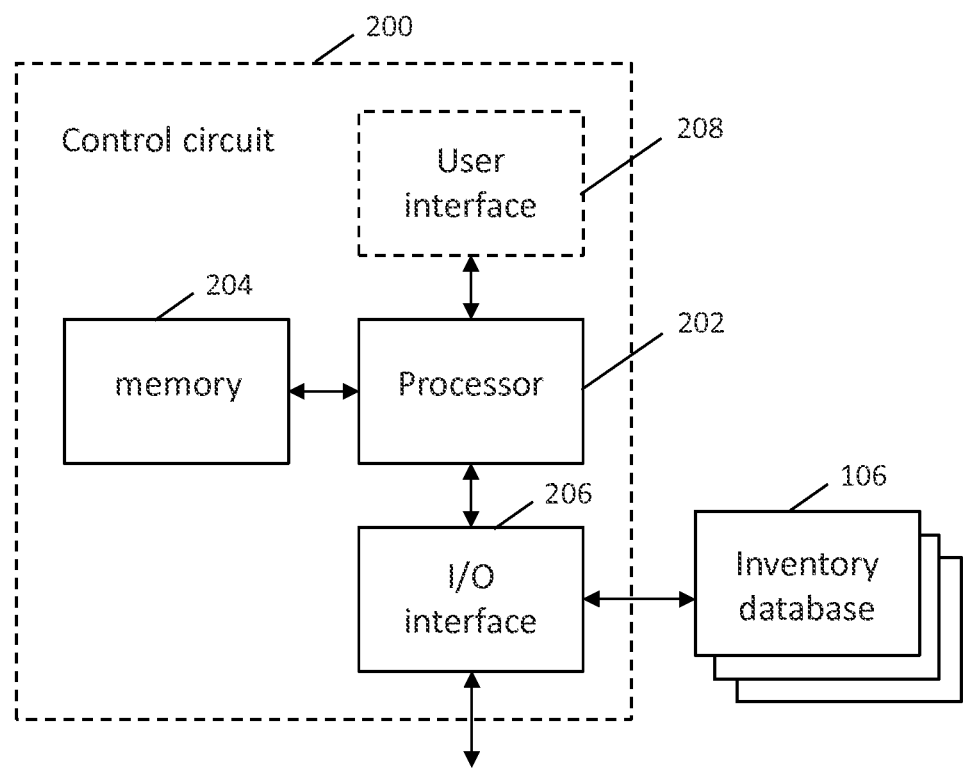
FIG. 2 is a block diagram in accordance with several embodiments.

FIG. 2 illustrates one embodiment of a control circuit such as generally shown in FIG. 1. The control circuit 200 includes a processor 202, a memory 204, an input/output (I/O) interface 206 (e.g., a backend interface) and an optional user interface 208 a frontend interface). Generally, the memory 204 stores the operational code or set of instructions that is executed by the processor 202 to implement the functionality of the control circuit. The memory 204 also stores any particular data that may be needed to make any of the determinations and/or corrections described herein. Such data may be pre-stored in the memory or be received, for example, from the one or more inventory databases 106 and/or the inventory control system 104 during use. It is understood that the processor 202 may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the system 200; however, the memory 204 can be internal, external or a combination of internal and external memory. Additionally, the control circuit may include a power supply (not shown) or it may receive power from an external source.

The processor 202 and the memory 204 may be integrated together, such as in a microcontroller, application specification integrated circuit, field programmable gate array or other such device, or may be separate devices coupled together. The I/O interface 206 allows communicational coupling of the control circuit to external components, such as the inventory databases 106, the inventory control system 104 and/or any user devices. Accordingly, the I/O interface 206 may include any known wired and/or wireless interfacing device, circuit and/or connecting device. In some embodiments, a user interface 208 is included in the control circuit 200 which may be used for user input and/or output display. For example, the user interface 208 may include any known input devices, such a buttons, knobs, selectors, switches, keys, touch input surfaces and/or displays, etc. Additionally, the user interface 208 may include one or more output display devices, such as lights, visual indicators, display screens, etc. to convey information to a user, such as an overstated PI condition and/or a quantification of that overstated PI condition. While FIG. 2 illustrates the various components being coupled together via the processor 202, it is understood that the various devices may actually be coupled to a communication bus of the control circuit 200 to which the processor 202 and/or memory 204 may also be coupled.

Generally, the control circuits 102 and 200 can comprise a fixed-purpose hard-wired platform or can comprise a partially or wholly programmable platform. It is also noted that one or more components of the control circuit 200 may be implemented in a monolithic or distributed manner. These architectural options are well known and understood in the art and require no further description here. These control circuits 102 and 200 are configured (for example, by using corresponding programming as will be well understood by those skilled in the art) to carry out one or more of the steps, actions, and/or functions described herein.

Figure 3:
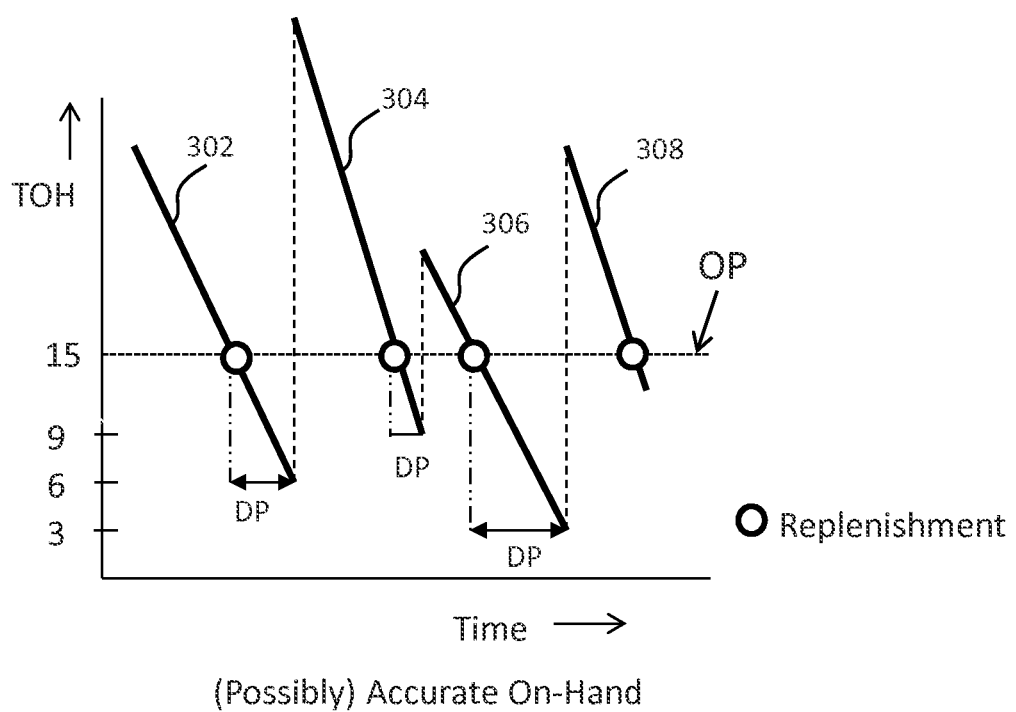
FIG. 3 is a diagram illustrating an exemplary situation in which an on hand item inventory level may be accurate in accordance with several embodiments.

Referring next to FIG. 3, a diagram is shown which illustrates an exemplary situation in which an on hand item inventory level may be accurate in accordance with several embodiments. In this example, cyclic sales data is used to plot a true on hand (TOH) inventory value of a particular inventory item over time. As seen in line 302, the true on hand value decreases as items are sold over time until a specified order point (OP) number is reached, at which point replenishment of the item occurs. In this example, replenishment occurs when the TOH value reaches 15 units. However, a period of time elapses before the replenishment arrives at the store which corresponds to the delivery period (DP); thus, line 302 continues to decrease during the delivery period until the replenishment arrives, e.g., decreases to a TOH value of 6. Then, the TOH value is adjusted by the received shipment and the TOH decreases according to line 304. Similarly, the TOH value decreases over time until the order point (OP) is reached and more replenishment is ordered. The TOH will continue to decrease during the delivery period (DP) until the replenishment arrives. This cycle continues in the example lines 306 and 308. Generally, in some embodiments, this cycle follows the formula DD×LT+DD≤OP, where DD is the daily demand in terms of units, LT is the lead time in time and OP is the order point. FIG. 3 illustrates a case where the PI is possibly accurate meaning that the PI in the system equals the TOH value.

Figure 4:
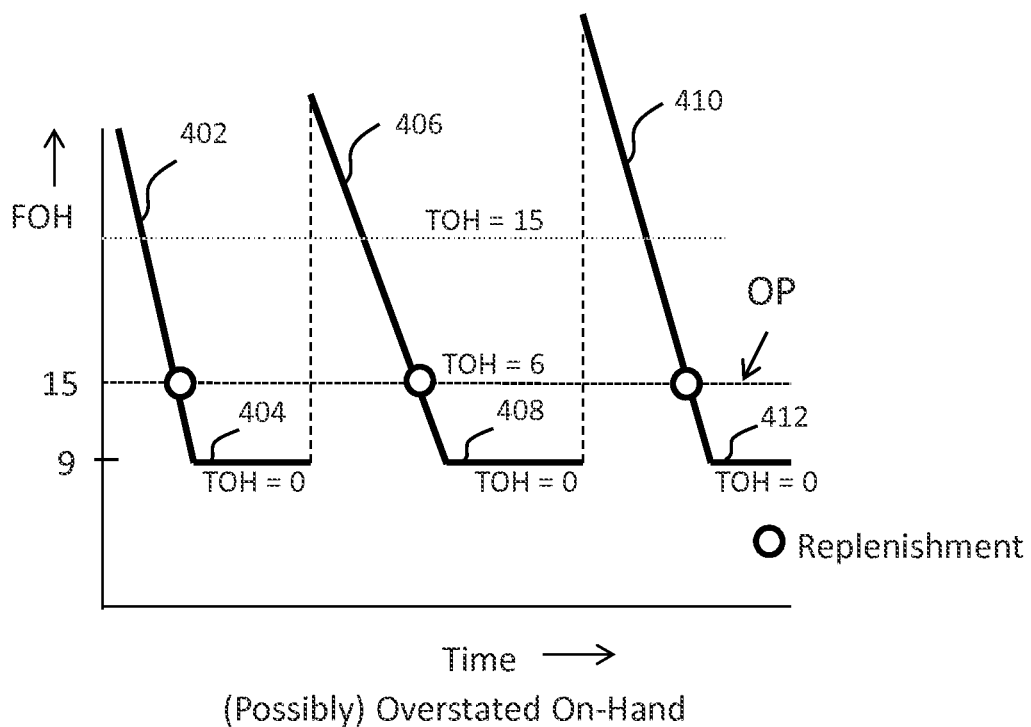
FIG. 4 is a diagram illustrating an exemplary situation in which an on hand item inventory level may be overstated in accordance with several embodiments.

Referring next to FIG. 4, a diagram is shown which illustrates an exemplar situation in which an on hand item inventory level may be overstated in accordance with several embodiments. In this diagram, the amount of inventory known to the system for a given item is more than the actual number of inventory items. In the example of FIG. 4, cyclic sales data is used to plot the perpetual inventory of a particular item, shown as a false on hand (FOH) inventory value of a particular inventory item over time. As seen in line 402, the false on hand value decreases as items are sold over time until a specified order point (OP) number is reached, at which point replenishment of the item occurs. In this example, the replenishment occurs when the FOH value of line 402 reaches a value of 15 units; however, at this point, the TOH is actually 6 units, not 15 units. Again, there is a time delay between ordering and arrival of the replenishment. Thus, the FOH value will continue to decrease below the FOH value of 15. In some embodiments where there is overstated PI, before the replenishment occurs, sales of the item will stop for a period of time indicated by flat line 404. This is because while the system thinks there is a positive on hand value (e.g., FOH is 9 units), the true on hand value is zero and thus, no more units can be sold until the replenishment arrives. Once replenished, sales will resume as indicated by line 406. As sales continue, the FOH value decreases until the order point is reached and another replenishment is ordered. Again, in the overstated PI condition, before the replenishment occurs, the FOH value will decrease and then stop at a non-zero value and there will be no further sales. This is indicated at flat line 408. At this point, the system thinks again there are 9 units of the item in inventory, but there is actually 0 items. Sales resume once replenishment occurs as shown by line 410. As sales continue, the FOH value decreases until the order point is reached and another replenishment is ordered. At the order point, the system thinks there are 15 units in inventory, but there are actually only 6 units. Again, in the overstated PI condition, before the replenishment occurs, the FOH value will decrease and then stop at a non-zero value and there will be no further sales indicated at flat line 412.

It is in the analysis of this cyclic sales data (e.g., units sold per period of time and/or on hand values over time) for an item of inventory that the system can automatically determine a likelihood that an overstated PI condition exists. For example, a control circuit can receive sales data and/or inventory data over time and make a determination that an overstated perpetual inventory (PI) condition exists with respect to an inventory level of the item at the retail store by determining that, a plurality of times, an item for sale sells to a non-zero inventory quantity value and then stops selling for a period of time. In the simple example of FIG. 4, the control circuit can determine that the item sold to a non-zero value of 9 multiple times and each time there was a corresponding period of no sales prior to replenishment. Accordingly, the control circuit automatically determines that an overstated PI condition exists. Further, in some embodiments, the control circuit automatically quantifies the condition, e.g., as being overstated by 9 units. Knowing the amount of the overstatement, the appropriate corrections may be automatically made to eliminate or reduce the severity of the overstated PI condition.

It is understood that there may be errors and other factors such that the non-zero value that the items sells down to before the period of no sales may not always be the same non-zero value. That is, in some embodiments, the inventory level of the items sells within a defined tolerance of the non-zero inventory quantity value and then stops selling for a period of time. For example, the control circuit may determine that the item sells to 9 units in the first cycle, sells to 10 units in the second cycle, then sells to 8 units in the third cycle. It is understood that the tolerance may vary based on the item and/or product category being evaluated. Accordingly, given tolerances, the control circuit identifies the non-zero quantity level as a quantity level of one of the cycles, e.g., the first non-zero quantity level is used, or the most frequently occurring non-zero quantity level.

In some embodiments, store processes can affect the determinations made by the control circuit. For example, store processes that manually or by other means change the on hand values may influence the automatic determinations. If such store processes correct any overstated PI conditions, the patterns may no longer be identified.

In some embodiments, the more times sales of the item fit the pattern illustrated in FIG. 4, the determination that an overstated PI condition exists will be more accurate. Furthermore, in some embodiments, the velocity of sales can contribute to the likelihood that any overstated PI condition is accurate. For example, a slow selling item may be more influenced by incremental or other errors or store processes, whereas a fast selling item may be easier to identify overstated PI conditions.

In some embodiments, the control circuit identifies the occurrence of the pattern at least twice to provide reliable automatic determinations of overstated PI conditions. It is possible that a similar pattern may be detected once but this does not necessarily mean with reliability that an overstated PI condition exists. That is, there may be other explanations or events that may result in a single pattern detection or identification. However, detection or identification of the pattern at least twice provides a reliable indication that, the overstated PI condition exists. For example, in some embodiments, as the number of identified pattern repetitions increases, the more reliable the determination that an overstated PI condition exists. Furthermore, in some embodiments, the identification of multiple occurrences of the pattern increases the accuracy of the quantification of the overstated PI condition at the non-zero value.

Figure 5:
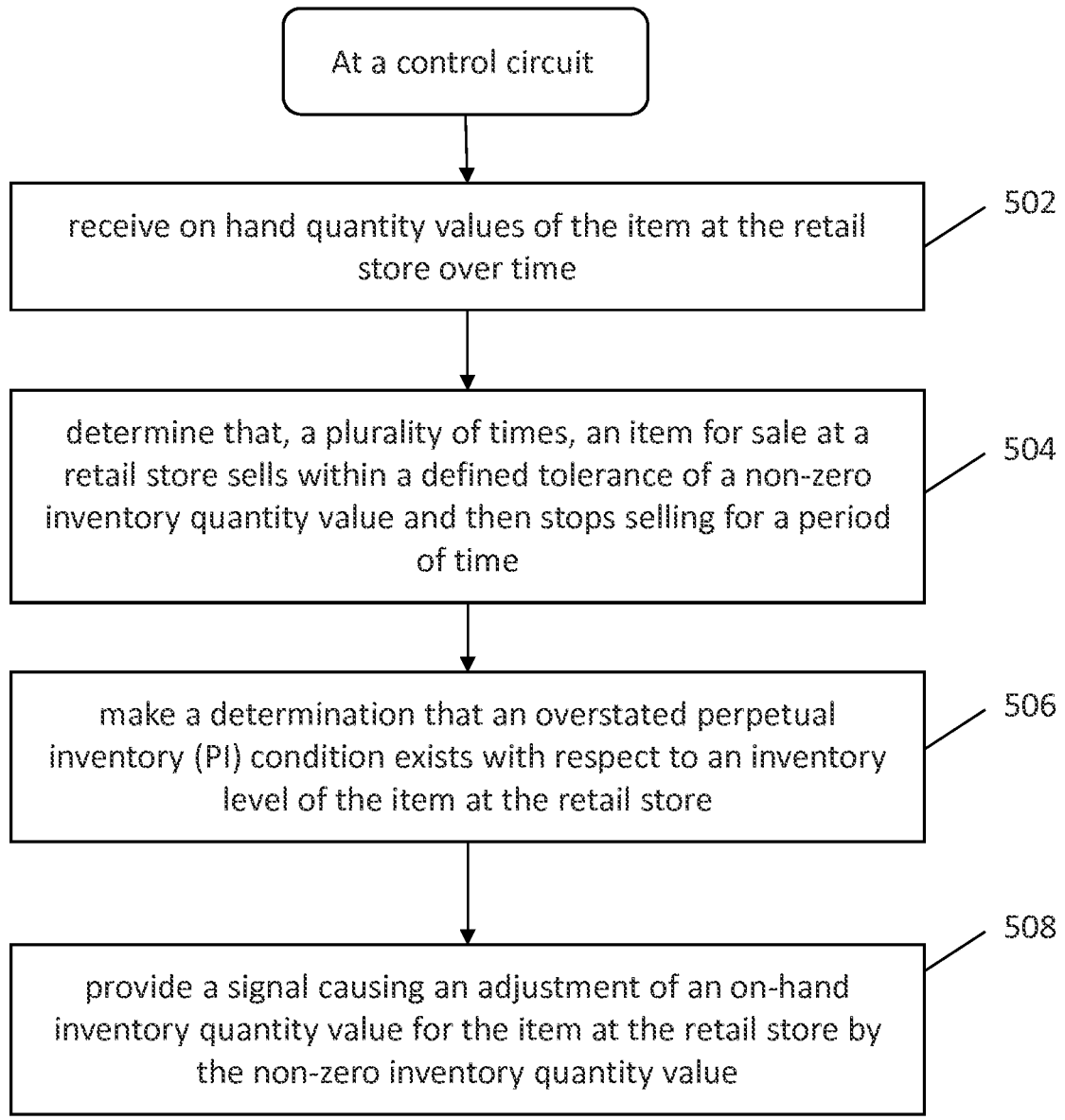
FIG. 5 is a flow diagram of an automated method in accordance with several embodiments.

Reference is now made to the flow diagram of FIG. 5 which illustrates a process occurring at a control circuit (e.g., control circuits 102 and/or 200) coupled to one or more inventory databases in accordance with several embodiments. The process of FIG. 5 may be performed by one or more of the systems, devices and applications described herein.

Generally, the control circuit uses (or is configured to use) at least sales and/or inventory information received from the databases 106 to automatically determine whether an overstated PI condition exists. In some embodiments, the amount of the overstated PI is automatically quantified and may be corrected.

In Step 502, the control circuit receives on hand quantity values of the item at the retail store over time. For example, the data may be received from remote store locations or from within a local inventory system. The data may be received for one or more of many items for sale. The inventory databases may be queried for sales data for specific products over a period of time in the past to the present (e.g., historical data), or may be received in an ongoing manner over time (e.g., daily). Further, in some embodiments, data may be received for certain products exceeding a price threshold or other filtering threshold/s. Various parameters and/or inputs may be used to select the data for processing. For example, parameters may define one or more of the item for analysis, the period of time to consider sales, a minimum item price to consider, and the number of times to look for pattern repetition. Further, various inputs for processing may be used including inputs to define one or more of the store where the item is sold, the item being sold, and on hand values for the item.

This inventory data/cyclic sales data is automatically processed by the control circuit to determine that, a plurality of times, an item for sale at a retail store sells within a defined tolerance of a non-zero inventory quantity value and then stops selling for a period of time (Step 504). It is understood that the number of the plurality of times may be variable (i.e., the number of pattern repetitions), but, that it is preferred that the number of times be two or more. In some embodiments, the tolerance about the non-zero inventory quantity level may be item dependent, e.g., input by a user input or defined in the system. For example, the tolerance may be higher for an item that that has an inventory in the hundreds and daily sales in the tens compared to an item having an inventory in the tens and daily sales in the ones, for example. In some embodiments, the length of the period of time (e.g., in days) that the item stops selling may be item dependent, input by a user input or defined in the system. For example, some items may have consistent and high sales volumes such that the control circuit may identify a short period of time of no sales to identity the pattern. Further, high sales velocity may result in a short period of time indicating the pattern. Given, that the pattern repeats, the item will begin reselling once replenished.

Next, the control circuit makes a determination that an overstated perpetual inventory (PI) condition exists with respect to an inventory level of the item at the retail store (Step 506). In some embodiments, it is the recognition of the repeated pattern of selling within a tolerance of the non-zero value and then not selling that indicates the overstated PI condition. As the number of cycles increases, the accuracy of the determination increases. In some embodiments, the control circuit outputs one or more outputs, such as one or more of the item, the store wherein the item is being sold, and an indication of an overstated PI condition.

It is noted that in some embodiments, steps 504 and 506 are performed for a single item of inventory. In other embodiments, the processing to make the determinations of steps 504 and 506 are performed for many items either at the same time or substantially the same time and/or contemporaneously as understood during automated processing. For example, in some embodiments, on hand inventory quantity values are monitored for each of a plurality of items for sale by a retail store over time. Accordingly, these values are processed to look for sales patterns indicated in step 504 for one or more of the items in order to make one or more determinations of step 506. For example, in some embodiments, the processing that may result in the performance of steps 504 and 506 occurs automatically and regularly for at least 100 different items for sale by the retail store; or for at least 1,000 different items for sale by the retail store; or for at least 10,000 different items for sale by the retail store.

Furthermore, in some embodiments, the amount of the overstated PI is automatically quantified by the control circuit. Once it is determined that an overstated PI condition exists, the control circuit then provides a signal causing an adjustment of an on-hand inventory quantity value for the item at the retail store by the non-zero inventory quantity value (Step 508). For example, using one or more of the embodiments described herein, an amount of the overstatement of the PI is automatically determined. In the example of FIG. 4, a signal would be output to cause the PI level to be decreased by 9 units so that the PI would then represent the true on hand (TOH) value. Again, it is understood that there may be daily or other periodic errors in the PI of the system and given the tolerances such that even as adjusted, the PI may still not exactly match the TOH, but the PI value will be much closer to the actual TOH value. This results in more efficient inventory control and reduces the likelihood of lost sales and other problems associated with overstated PI.

It is noted that the techniques described herein apply to determinations of overstated PI conditions in any retail store setting or other setting where an inventory of items is stored and used in inventory management processes, such as forecasting, ordering and/or replenishment. As such, in some embodiments, the processes may apply to retail sales in a traditional retail store, such as a "brick and mortar" store. In other embodiments, the processes apply to inventory management in an online or remote ordering "store" in which inventory is maintained remote of the consumer shopping location, e.g., managing inventory of local and/or regional distribution centers or other inventory storage locations for online or remote sales transactions.

Referring next to FIG. 6, an exemplary algorithm 600 to implement an overstated PI determination process is illustrated in accordance with some embodiments. In this algorithm, several parameters are considered when the control circuit attempts to identify sales patterns potentially corresponding to overstated PI conditions including: (1) a time period "N" of the historic data used to identify events or patterns or how far to look back in the sales/inventory data, e.g., the length of time on the x-axis in FIGS. 3/4 (e.g., in days or number of weeks or other suitable period); (2) a minimum time period "t" to consider for no sales before triggering the determination of whether the period qualifies for a no sales pattern, e.g., the minimum time for the period of flat lines 404, 408, and 412 in FIG. 4. (e.g., in days or other suitable period); (3) a filtering price "p" useful to process items above the price p; and (4) a pattern count "c" defining the minimum repetitions of the no sales pattern. Note that in some embodiments, not all "no sales periods' may qualify for a pattern; only those 'no sales periods' that satisfy some other conditions based on length of no sales and/or the expected sales qualify for 'no sales pattern". It is noted that in some embodiments, one or more or all of these parameters may be used to obtain the sales/inventory data for analysis. It is understood that in other embodiments, additional parameters may be used as well. These parameters may be input by a user via an appropriate user interface or may be stored as default values by the control circuit.

In the example algorithm 600, the following variables {<s, i, oh, ts>} are input to the control circuit for processing: (1) "s" defines the retail store; (2) "i" defines the item for Which the PI is being examined; (3) "oh" is the on hand inventory quantity value for the item as retrieved from the inventory database; and (4) "ts" is the time stamp of the oh value. This data is processed and an output is generated as a listing {<s, i, [$d_1$, $d_2$, . . . ,]>} where (1) "s" indicates the store; and (2) "i" indicates an overstated PI condition (3) during time periods $d_1$, $d_2$, . . . .

The algorithm 600 includes the following hash tables "lastOnHand", "periodActive", "marked", "overstatedOnHand", "frequencyOverstated" and "timePeriods", and Hash Set "potentialOverstatedItems". The example Run-time is expected to be linear in the input list size. The example space needed is linear depending on the number of items. The process and functionality of the embodiments of the process indicated by the above algorithm are apparent to those of ordinary skilled in the art. Furthermore, one of ordinary skill in the art can write the appropriate source code to implement this functionality and other functionality described herein.

Referring next to FIG. 7, another exemplary algorithm 700 to implement an overstated PI determination process is illustrated in accordance with some embodiments. In this further exemplary algorithm 700, at least some of the variables from FIG. 6 are similarly used. In some embodiments, the algorithm 700 assumes that all input, tuples <s, i, oh, ts> for item i are considered in the increasing sequence of timestamps ts. The algorithm 700 also includes a stack of records "recordStack[s, i]" for storing possible no sales patterns e.g., flat lines 404, 408, 412). As is well understood in the art, a stack is a standard data structure in which the last inserted record is the first one to be removed during the deletion operation, i.e., a stack supports LastInFirstOut property. When all the input tuples <s, i, oh, ts> corresponding to item i are considered, the stack recordStack[s, i] holds the no sales patterns for this item during the time period N. Again, the example run-time is expected to be linear in the input list size and the example space is expected to be linear in the number of items. The process and functionality of the embodiments of the process indicated by the algorithm 700 are apparent to those of ordinary skilled in the art. Furthermore, one of ordinary skill in the art can write the appropriate source code to implement this functionality and other functionality described herein.

In some embodiments, systems, apparatuses and methods are provided herein useful to automatically determine whether an overstated perpetual inventory (PI) condition exists regarding an inventory level of an item in a retail establishment. In some embodiments, a method performed by a control circuit comprises determining that, a plurality of times, an item for sale at a retail store sells within a defined tolerance of a non-zero inventory quantity value and then stops selling for a period of time; and to making a determination that an overstated perpetual inventory (PI) condition exists with respect to an inventory level of the item at the retail store. In some embodiments, an apparatus comprises a control circuit and a memory coupled to the control circuit and storing computer instructions that when executed by the control circuit perform the above steps.

In some embodiments, a method performed by a control circuit comprises monitoring on hand inventory quantity values for each of a plurality of items for sale by a retail store over time; determining that, a plurality of times, one or more of the plurality of items sells within a defined tolerance of a non-zero inventory quantity value corresponding to each of the one or more of the plurality of items and then stops selling for a period of time; and making a determination that an overstated perpetual inventory (PI) condition exists with respect to an inventory level of the one or more of the plurality of items at the retail store. In some embodiments, an apparatus comprises a control circuit and a memory coupled to the control circuit and storing computer instructions that when executed by the control circuit perform the above steps.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method comprising:
   presenting and selling items to customers at a retail store;
   by an inventory control device, ordering replenishment items for the retail store;
   associating an item in the retail store with a Perpetual Inventory (PI) value, the PI value being the amount of the item believed to be on-hand at the retail store;
   by a control circuit,
   obtaining sales data from the retail store regarding the sale of the item to the customers at the retail store;
   determining that, a plurality of times and from the sales data, the item for sale at a retail store sells within a defined tolerance of a non-zero inventory quantity value and then stops selling for a period of time;
   making a determination that an overstated perpetual inventory (PI) condition exists with respect to a PI level of the item at the retail store;
   when an overstated PI condition exists, determining an amount of the overstatement based upon the sales data; and
   adjusting the PI value according to the amount of the overstatement;
   wherein the inventory control device selectively causes replenishment the item in the store based to occur upon the adjusted PI value by ordering replacement items;
   wherein the item is physically replenished in the retail store using the replacement items.

2. The method of claim 1 further comprising, by the control circuit, providing a signal causing an adjustment of an on-hand inventory quantity value for the item at the retail store by the non-zero inventory quantity value.

3. The method of claim 1 wherein each of the plurality of times, the item begins reselling after being replenished.

4. The method of claim 1 wherein the period of time may be selected and corresponds to a number of days.

5. The method of claim 1 wherein one or both of the period of time and the defined tolerance is dependent on the item.

6. The method of claim 1 further comprising, by the control circuit, receiving on hand quantity values of the item at the retail store over time, wherein the on hand quantity values are used in the determining step.

7. The method of claim 1, further comprising, by the control circuit, selecting the item from a plurality of items based on a sales price of the item exceeding a price threshold.

8. The method of claim 1, further comprising, by the control circuit, receiving a first parameter indicating the item, a second parameter defining the period of time, a third parameter defining a minimum price of the item, and a fourth parameter defining the plurality of times,
   wherein the parameters are used in the determining step.

9. The method of claim 1 further comprising, by the control circuit, receiving a first input defining the retail store, a second input defining the item, and third inputs defining on hand quantity values over time,
   wherein the inputs are used in the determining step.

10. The method of claim 1 further comprising, by the control circuit, providing a first output indicating the retail store, a second output indicating the item, and a third output indicating the overstated PI condition.

11. The method of claim 1 further comprising, by the control circuit, identifying the non-zero quantity value as a quantity level that the items sells to and stops selling for the period of time corresponding to one of the plurality of times.

12. A method comprising:
   presenting and selling a plurality of items to customers at a retail store;
   by an inventory control device, ordering replenishment items for the retail store;
   associating each item of the plurality of items in the retail store with a Perpetual Inventory (PI) value, the PI value being the amount of the item believed to be on-hand at the retail store;
   by a control circuit:
   monitoring on hand inventory quantity values for each of the plurality of items for sale by a retail store over time;
   determining that, a plurality of times and from the monitoring, one or more of the plurality of items sells within a defined tolerance of a non-zero inventory quantity value corresponding to each of the one or more of the plurality of items and then stops selling for a period of time; and
   making a determination that an overstated perpetual inventory (PI) condition exists with respect to a PI level of the one or more of the plurality of items at the retail store;

when an overstated PI condition exists, determine an amount of the overstatement based upon the monitoring; and adjust the PI value according to the amount of the overstatement;

wherein an inventory control device selectively causes replenishment of the item to occur in the store based upon the adjusted PI value by ordering replacement items;

wherein the item is physically replenished in the retail store using the replacement items.

13. The method of claim 12 wherein the plurality of items comprises one or more of: at least 100 different items for sale by the retail store; at least 1,000 different items for sale by the retail store; and at least 10,000 different items for sale by the retail store.

14. The method of claim 12 further comprising, by the control circuit, providing a signal causing an adjustment of an on-hand inventory quantity value for the one or more of the plurality of items at the retail store by the non-zero inventory quantity value.

15. An apparatus comprising:
a retail store, the retail store presenting and selling items to customers;
an inventory control device that is configured to order replenishment items for the retail store;
wherein an item in the retail store is associated with a Perpetual Inventory (PI) value, the PI value being the amount of the item believed to be on-hand at the retail store;
a control circuit;
a memory coupled to the control circuit and storing computer instructions that when executed by the control circuit perform the follows steps:
 obtain sales data from the retail store regarding the sale of the item to the customers at the retail store;
 determine that, a plurality of times and from the sales data, the item for sale at a retail store sells within a defined tolerance of a non-zero inventory quantity value and then stops selling for a period of time;
 make a determination that an overstated perpetual inventory (PI) condition exists with respect to a PI level of the item at the retail store;
 when an overstated PI condition exists, determine an amount of the overstatement based upon the sales data; and
 adjust the PI value according to the amount of the overstatement;
wherein the inventory control device selectively causes replenishment of the item to occur in the store based upon the adjusted PI value by ordering replacement items;
wherein the item is physically replenished in the retail store using the replacement items.

16. The apparatus of claim 15 further comprising a database accessible by the control circuit, the database storing on hand inventory quantity values at different points in time for the item at the retail store.

17. The apparatus of claim 15 wherein the control circuit and memory are located at the retail store.

18. The apparatus of claim 15 wherein the control circuit and memory are located at a central location remote from the retail store.

19. The apparatus of claim 15 wherein the control circuit is configured to provide a signal causing an adjustment of an on-hand inventory quantity value for the item at the retail store by the non-zero inventory quantity value.

20. The apparatus of claim 15 wherein each of the plurality of times, the item begins reselling after being replenished.

21. The apparatus of claim 15 wherein the period of time may be selected and corresponds to a number of days.

22. The apparatus of claim 15 wherein one or both of the period of time and the defined tolerance is dependent on the item.

23. The apparatus of claim 15 wherein the control circuit receives on hand quantity values of the item at the retail store over time, wherein the on hand quantity values are used to determine that, the plurality of times, the item sells within the defined tolerance of the non-zero inventory quantity level.

24. The apparatus of claim 15 wherein the control circuit receives a first input defining the retail store, a second input defining the item, and third inputs defining on hand quantity values over time,
wherein the inputs are used to determine that, the plurality of times, the item sells within the defined tolerance of the non-zero inventory quantity level.

25. The apparatus of claim 15 wherein the control circuit provides a first output indicating the retail store, a second output indicating the item, and a third output indicating the overstated PI condition.

26. The apparatus of claim 15 wherein the control circuit identifies the non-zero quantity value as a quantity level that the items sells to and stops selling for the period of time corresponding to one of the plurality of times.

27. An apparatus comprising:
a retail store, the retail store presenting and selling items to customers;
an inventory control device that is configured to order replenishment items for the retail store;
wherein an item in the retail store is associated with a Perpetual Inventory (PI) value, the PI value being the amount of the item believed to be on-hand at the retail store;
a control circuit;
a memory coupled to the control circuit and storing computer instructions that when executed by the control circuit perform the follows steps:
 monitor on hand inventory quantity values for each of a plurality of items for sale by a retail store over time;
 determine that, a plurality of times and from the monitored on hand quantity, one or more of the plurality of items sells within a defined tolerance of a non-zero inventory quantity value corresponding to each of the one or more of the plurality of items and then stops selling for a period of time; and
 make a determination that an overstated perpetual inventory (PI) condition exists with respect to a PI level of the one or more of the plurality of items at the retail store;
 when an overstated PI condition exists, determine an amount of the overstatement based upon the monitored on hand quantity; and
 adjust the PI value according to the amount of the overstatement;
wherein an inventory control device selectively causes replenishment of the item to occur in the store based upon the adjusted PI value by ordering replacement items;

wherein the item is physically replenished in the retail store using the replacement items.

\* \* \* \* \*

UNITED STATES PATENT AND TRADEMARK OFFICE
CERTIFICATE OF CORRECTION

PATENT NO. : 10,546,258 B2
APPLICATION NO. : 15/313870
DATED : January 28, 2020
INVENTOR(S) : Matthew A. Jones et al.

It is certified that error appears in the above-identified patent and that said Letters Patent is hereby corrected as shown below:

In the Specification

Column 1, Line 6, delete "APPLICATIONS(S)" and insert -- APPLICATION(S) --, therefor.

In the Claims

Claim 1, Column 10, Line 4, after "replenishment", insert -- of --, therefor.
Claim 6, Column 10, Line 20, delete "on hand" and insert -- on-hand --, therefor.
Claim 6, Column 10, Line 21, delete "on hand" and insert -- on-hand --, therefor.

Signed and Sealed this
Twenty-sixth Day of May, 2020

Andrei Iancu
*Director of the United States Patent and Trademark Office*